United States Patent [19]

Hause

[11] 3,748,851

[45] July 31, 1973

[54] HYDROSTATIC TRANSMISSION POWER PACKAGE

[75] Inventor: Gilbert K. Hause, Bloomfield Hills, Mich.

[73] Assignee: General Motors Corporation, Detroit, Mich.

[22] Filed: Nov. 8, 1971

[21] Appl. No.: 196,362

[52] U.S. Cl.............. 60/19, 60/DIG. 5, 60/456, 60/485
[51] Int. Cl............... F01p 3/00, F16h 39/00
[58] Field of Search........... 60/53 B, 19, 52 US, 60/DIG. 5, 456, 485

[56] References Cited
UNITED STATES PATENTS

| | | | |
|---|---|---|---|
| 2,220,636 | 11/1940 | Bischof | 60/53 B |
| 2,359,758 | 10/1944 | Hainren | 60/19 |
| 3,165,069 | 1/1965 | Adamek | 60/53 B X |

Primary Examiner—Edgar W. Geoghegan
Attorney—W. E. Finken and A. M. Heiter

[57] ABSTRACT

A unitary power assembly including an internal combustion engine and a hydrostatic transmission having a pump hydrostatic unit and two motor hydrostatic units mounted directly on the engine housing. The engine and a hydrostatic unit have a common housing member and a common fluid cooling system. In one modification the camshaft is the engine power output shaft driving the pump, the engine cooling system crossover and outlet passage member is a part of the pump housing, the hydrostatic transmission power circuit passages are within the common cooling fluid cavity and the motors are fluid cooled to provide a common engine and hydrostatic cooling system substantially completely enclosing the hydrostatic transmission for cooling and silencing. In another modification the pump is driven by the engine crankshaft and the hydrostatic transmission power transfer passages are provided by a manifold.

26 Claims, 7 Drawing Figures

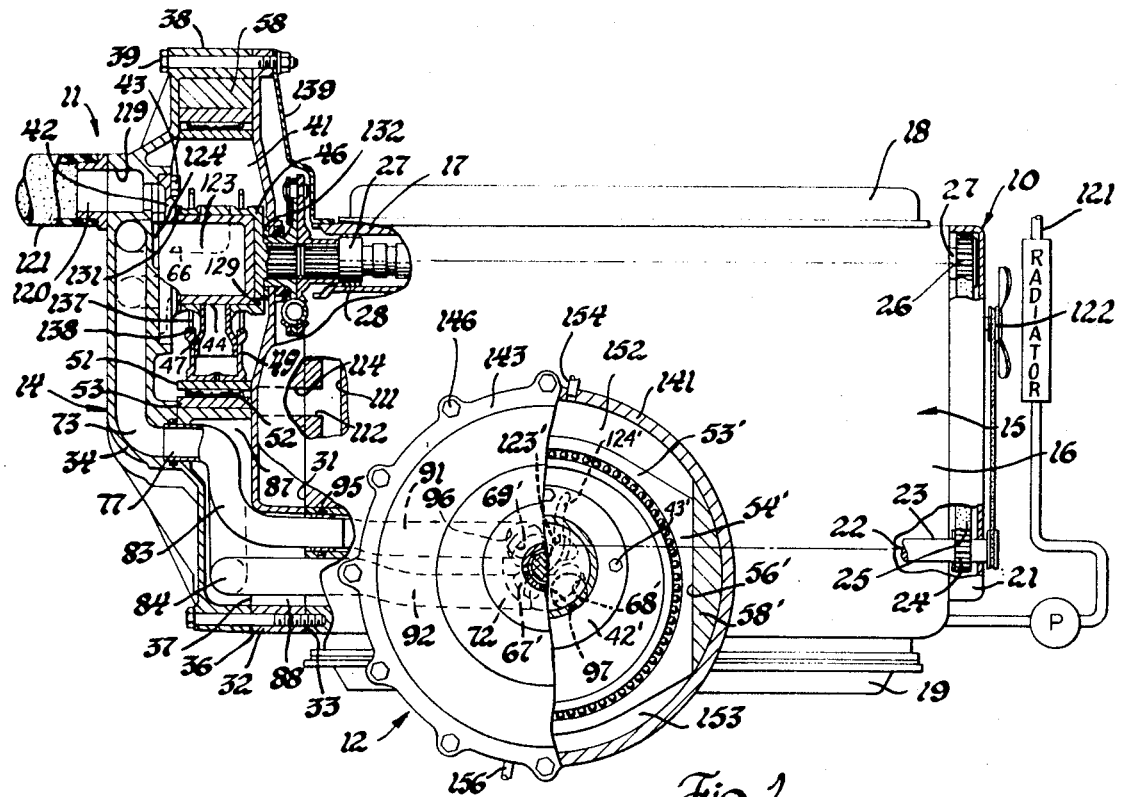

INVENTOR.
Gilbert K. Hause
BY
A. M. Neiter
ATTORNEY

INVENTOR.
Gilbert K. Hause
BY
a.M. Neiter
ATTORNEY 3,748,851

HYDROSTATIC TRANSMISSION POWER PACKAGE

This invention relates to unitary power assemblies and particularly to an engine and hydrostatic transmission assembly.

This invention provides a unitary power assembly having an internal combustion engine and hydrostatic transmission having a pump hydrostatic unit and two motor hydrostatic units mounted directly on the engine housing. The radial piston type pump is directly connected to the engine power output shaft extending from the engine housing. The engine housing has an external pump supporting pad and the pump housing has a mounting pad fitting the supporting pad on the engine housing. In one arrangement the pump is driven by the engine camshaft. When the pump housing is bolted to the engine housing with the mounting pad of the pump sealed to the supporting pad of the engine, the pump hydrostatic power transfer passages and cooling fluid passages are connected respectively to hydrostatic power flow passages and the cooling fluid cavity in the block portion of the engine housing. In another arrangement the engine housing has an external pump supporting pad surrounding the crankshaft driven flywheel and the cavity therefor. The pump housing is secured to the engine housing with its mounting pad in sealing contact with the pump supporting pad of the engine housing to enclose the flywheel cavity. A manifold is connected to the pump and engine housings to interconnect the hydraulic power flow passages. Each side of the engine block portion of the engine housing is formed to provide an externally facing motor housing portion which is covered and sealed by a cover portion of the motor housing. The inner portion of the motor housing is thus formed as an integral or common part of the engine block and has hydraulic power flow passages and cooling fluid passages connected to the motor pintle attached thereto providing a connection to its hydraulic power flow passages and cooling cavity. The motor rotor is rotatably mounted on the pintle and carries the rotatable pistons and cylinders. The pistons are slidably mounted for rotation on a bearing ring which is rotatably mounted on a control ring which is mounted in the inner pump housing integral with the engine block.

Thus in this unitary engine and hydrostatic transmission assembly radial type hydrostatic pump and motor units are employed to provide a compact assembly. The hydrostatic unit housings are mounted directly on the engine block portion of the engine housing. Portions of the engine block structure provide hydrostatic unit housing portions and thus are a common member of the engine block or housing and a hydrostatic unit housing. The engine and hydrostatic unit cooling systems are interconnected to provide a common cooling system for the engine and the hydrostatic transmission. The pump housing includes the engine cooling fluid crossover passages and radiator outlet in a form of this common system. The common engine transmission cooling fluid also contacts the hydrostatic power transfer passages extending through the engine block, and the hydrostatic pump and motor housings and pintles. The cooling water system contacts and surrounds a sufficient portion, which may be all or part of the hydrostatic transmission, pump, power transfer passages and motor, for silencing by damping transmission parts and reducing noise emission.

An object of the invention is to provide an improved and more compact unitary engine and hydrostatic pump and motor unit transmission assembly.

Another object of the invention is to provide a unitary engine and hydrostatic transmission assembly in which the engine and a hydrostatic unit have a common housing portion.

Another object of the invention is to provide a unitary engine and hydrostatic transmission assembly having a hydrostatic unit mounted directly on an engine housing support pad and a common engine housing and hydrostatic unit cooling fluid passage system interconnected at the support pad.

Another object of the invention is to provide a unitary engine and hydrostatic transmission assembly in which the engine and transmission cooling system contacts a substantial portion of the hydrostatic transmission for silencing.

Another object of the invention is to provide a unitary engine and hydrostatic pump and motor unit transmission assembly having a mounting portion formed integrally with a portion of the engine housing and a hydrostatic unit housing portion secured thereto to provide a hydrostatic unit chamber enclosing the hydrostatic unit operating mechanism.

Another object of the invention is to provide a unitary engine and hydrostatic pump and motor unit transmission assembly having hydrostatic pump and motor units mounted directly on the engine housing and having interconnecting power transfer passages formed in the engine housing.

Another object of the invention is to provide a unitary engine and hydrostatic transmission assembly having a pump assembly driven by an engine power output shaft, directly mounted on the engine housing about said shaft and having hydraulic power flow passages connected to hydraulic power flow passages in the engine housing terminating centrally of a motor mounting pad at each side of the engine housing forming an inner motor housing portion having a pintle supporting the motor rotor and a cover portion attached to the inner motor housing portion and each motor having an output shaft to provide a drive shaft extending from each side of the engine housing.

These and other objects of the invention will be more apparent from the following description and drawing in which:

FIG. 1 is an elevation view of the engine and hydrostatic transmission assembly with parts broken away to show features.

FIG. 2 is an end view of the FIG. 1 assembly with parts broken away to show features.

FIG. 3 is an enlarged view of the pump shown in FIG. 1 with parts broken away to show other features.

Figure 4:
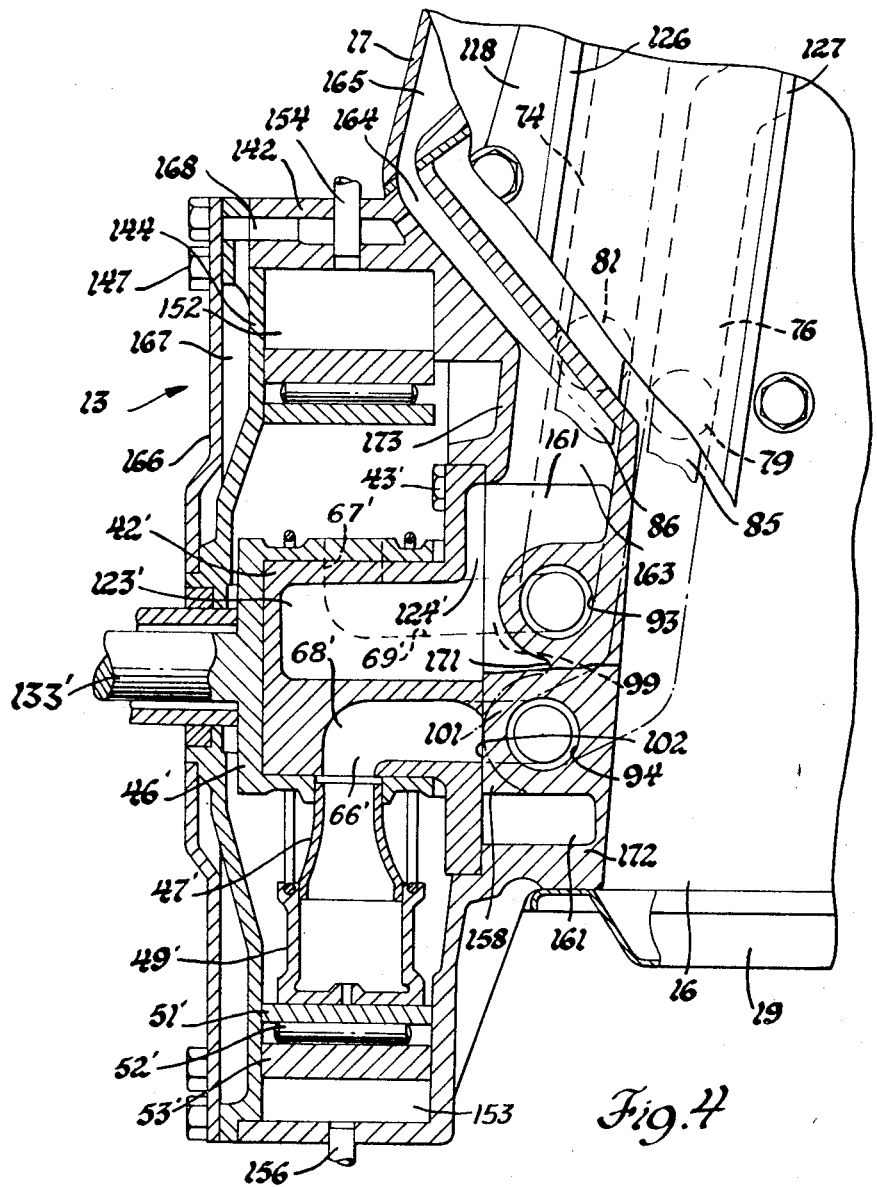
FIG. 4 is an enlargement of a motor portion of FIG. 2.

This unitary power plant or internal combustion engine and hydrostatic transmission assembly has an internal combustion engine 10 and a hydrostatic transmission including a pump 11, a pair of hydrostatic motors 12 and 13 and interconnecting power transfer passages 14. The internal combustion engine 10 has conventional power developing components and may be of the in-line type as shown for example in the Enos A. De Waters' U.S. Pat. No. 1,723,412 patented Aug. 6, 1929 or of the V-8 type as shown for example in the Charles A. Chayne U.S. Pat. No. 2,781,750 patented Feb. 19, 1957. Referring to FIG. 1, the internal combustion engine 10 has a housing 15 including a conventional block portion 16, head portion 17, valve cover 18, oil pan 19 and timing drive cover 21. The power developing mechanism 22, not shown in detail, includes the crankshaft 23 which drives the driving timing gear 24 which is connected by a timing chain 25 or other suitable means to the driven timing gear 26 which drives the camshaft 27 suitably mounted for rotation by bearings 28 in the head portion 17. The engine block 16 portion of the housing 15 has at its forward end an exterior wall or supporting pad portion 31.

The pump 11 has an intermediate housing portion 32 having a mounting face 33 or interface wall engaging supporting face 31 of the engine block forming the interface 31–33 and a main housing portion 34 having a mounting face 36 engaging the supporting face 37 on the intermediate housing 32 at interface 36–37.

The main housing portion 34 has an annular wall 38 extending coaxially of the pump axis and secured by an annular series of bolts 39 to the intermediate housing portion 32 to define a chamber 41 in which the radial pump operating assembly is located. This portion of the pump assembly is basically like the E. E. Simmons U.S. Pat. No. 3,274,946 dated Sept. 27, 1966. The pintle 42 is fixed by an annular series of screws 43 through its flange to the inside of the main housing portion and has a coaxial cylindrical bearing 44 extending substantially across chamber 41 to rotatively support the rotor 46. The rotor has an annular series of apertures and hollow spokes 47 fixed to the rotor in each aperture providing a passage through the spokes and rotor to the pintle. The spokes have at their free end an external cylindrical piston surface cooperating with the cylindrical internal surface of the cylinders 49. The base of each cylinder has a hydrostatic bearing or slipper bearing which slides on the inner cylindrical surface of the bearing ring 51. The external cylindrical surface of bearing ring 51 is supported by a full annular compliment of needle bearings 52 mounted in the internal cylindrical surface of the control ring 53 (FIG. 3). The control ring 53 has a top slide bearing surface 54 and a bottom slide bearing surface 55 which are flat, parallel and horizontal as viewed in the drawing and slide respectively on the contacting bearing surface 56, 57 respectively of a top bearing block 58 and bottom bearng block 59. The bearing locks fit in chamber 41 and are secured to, or may be formed integrally with, the main housing portion 34.

As shown in the above Simmons patent, the control ring 53 fits within chamber 41 for horizontal sliding movement to move the control ring center to either side of the pintle center and there are chambers at each end supplied with pump displacement control fluid from a suitable control system via lines 61 and 62 (FIG. 2) to vary the eccentricity of the control ring axis relative to the pintle axis to vary pump displacement. This horizontally slidable pump displacement control ring 53 is like the motor displacement control ring 53' but the latter slides vertically.

Depending on both the direction of pump rotation and whether the control ring center is on one or the other side of the pintle center, fluid is pumped in either direction through the hydrostatic power transfer passages 14 having a portion 65 cast in the front face of the main pump housing. Thus, fluid may flow in either direction between a first pintle port 66 and a second pintle port 67 each aligned wih rotor 46 ports and are chordal segments extending peripherally about 150° as shown in FIGS. 3 and 5.

Figure 5:
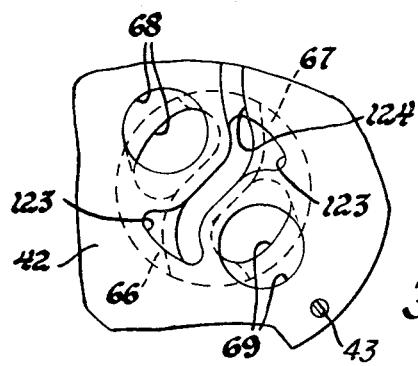
FIG. 5 is a partial view of a pintle from the flanged end and the housing wall to which it is attached to show the ports.

The first and second pintle ports 66 and 67 adjacent opposite ends respectively, have a faired curve connection to axial elliptical passages 68 and 69 in the pintle which at the interface between the pintle and main housing 34 have a faired curve to a circular connection to the circular housing ports 71 and 72, FIGS. 2 and 5 in the main housing 34. The port 71 connects, viewed from the pump end of the engine as shown in FIG. 2, to a right passage 73 and a left passage 74 cast in the front face of the main pump housing. Similarly port 72 connects to right and left passages 75 and 76. These inversely congruent pairs of passages 65, the right side passages 73 and 75 and the left side passages 74 and 76 in the face of the main pump housing extend downwardly and outwardly toward the sides of the engine and curve into axial securing and sealing counterbored passage portions 77, 78, 79 and 81 respectively, closely about the housing enclosing pump chamber 41. Each of these axial passage portions has a shouldered press fit securing and sealing counterbore 77 which may include an annular ring seal and sealing counterbore shoulder as best shown by the sealing counter-bore 77 in FIG. 1. Ogee curved pipes 83, 84, 85 and 86 are respectively secured and sealed in the counterbored passages 77, 78, 79 and 81 and form a continuation respectively of passages 73, 75, 76 and 74 extending downwardly through a cooling fluid cavity 87 in the main pump housing 34 and then axially through cooling fluid cavity 88 in intermediate housing 32 into a sliding sealing fit in the axial passages 91, 92, 93 and 94 in the lower portion of the engine block. The cooling fluid cavities 87 and 88 are interconnected with each other and with the engine cooling fluid cavity 111 as explained below. The sliding sealing fit of the block end of the pipes 83, 84, 85 and 86 in the axial passages 91, 92, 93 and 94 in the block is illustrated by the ring seal 95 in FIG. 1 and may include a shoulder seal (not shown). In the right side as viewed in FIGS. 1 and 2 the axial passages 91 and 92 in the engine block curve outwardly and terminate respectively in ports 96 and 97 in the right motor supporting face 98 on the engine block. In the left side of the block axial passages 93 and 94 curve outwardly and terminate respectively in ports 99 and 101 in left motor supporting face 102.

The above described passages between the pump 11 and each motor 12–13, the hydrostatic power transfer passages 65 of the hydrostatic transmission, carry fluid at very high pressure. While the passages provided by pipes 83, 84, 85 and 86 may be cast integrally with the pump housing, it is preferred, in order to simplify the sealing and manufacture of the interfaces and the pump housings to use pipes suitably bent to fit, located in cavities 87 and 88 in the pump housing. Each pipe is sealed at the pump end to the main pump housing and at the motor end to the engine block. The seals at the pump end of the pipes are illustrated on pipe 83 which has a sealing press fit and shoulder seal in passage 77. The seals at the motor end of the pipes are illustrated on pipe 83 by a ring seal 95 in passage 91 preferably at the front end of the block but it may be located at the motor ports so the pipes extend through the block.

When pipes are used, the walls between pairs of passages having pipes therein and between the pipe end seals are not needed. The space around the pipes and between end seals is used as a cooling fluid cavity connected to the engine cooling fluid cavity.

As shown in FIG. 1, the engine housing cooling fluid cavity 111 has a right outlet port 112 in the engine block supporting pad or face 31 connected by right connecting cooling fluid passage 114 extending through intermediate housing portion 32.

The passage 114 is preferably merely the upper end of cavity 88 in intermediate housing 32 but may be a perforated passage so the chamber 88 in the intermediate housing and connected chamber 87 in the main housing 34 are filled for cooling and silencing of pipes 83, 84, 85, 86 and for guiding flow to port 116 in the main housing. The cooling fluid then flows from the right port 116 forward in the main housing portion 34 to right pump cooling passage 117 formed or cast as a part of ht the face of the main pump housing like the power circuit passages. The right cooling passage extends upwardly and toward the upper center of the front of the pump and connects to an inversely congruent left cooling fluid passage 118 which similarly receives engine cooling fluid from a left cooling port in the engine block and left connecting passage in the intermediate pump housing and left cooling fluid port in the main pump housing which are not shown but are all inversely congruent to the right ports and passages shown in the drawing on right side. At the top of the pump, substantially at the apex where cooling fluid passages 117 and 118 join, there is a port 119 through the front wall of main pump housing 34 having a radiator hose fitting 120 secured to the main pump housing. This fitting may have a conventional thermostatic valve and the hose 121 is conventionally connected to the radiator inlet. The radiator outlet is conventionally connected by a passage and water pump P to the engine cooling cavity inlet to cooling cavity 111.

A conventional fan and drive 122, including a crankshaft driven pulley, fan belt, a fan shaft mounted on the engine, a fan pulley and fan is used to provide an engine driven fan between the radiator and engine. This arrangement of the radiator in front of the engine so the cooling fluid from the bottom of the radiator is circulated through the engine block from the front lower portion and flows rearwardly and upwardly cooling the engine, hydrostatic motors and hydrostatic lines to the rear upper portion where it enters and cools the hydrostatic pump and then is returned to the radiator is preferred since the hydrostatic system can operate at higher temperatures than the engine.

As best shown in FIGS. 1 and 5, the pintle has an pintle cooling fluid cavity 123 extending axially almost the full length and almost the full transverse diameter as shown in FIG. 5. The pintle cavity is made as large as possible considering the space requirements of ports 66, 67 and passages 68, 69 and leaving sufficient metal therebetween to meet pintle strength requirements. At the interface between pintle 42 and the inside of the front wall of main housing 34 there is a recess in both faces, or at least one face forming a passage 124 interconnecting the pintle cavity 123 to port 119 and cooling fluid passages 117 and 118. Thus from a high portion of the engine cooling fluid cavity 111 cooling fluid flows out to pump cooling passages 117 and 118 in the front wall of the pump and cooling cavity 123 in pintle 42 to cool the pump. The area of the passages 117, 118 on the front face of the pump is made sufficiently large for cooling and covers a large area for silencing of the pump. It will be appreciated that the cooling passages and connected cavities on the pump housing may cover the entire surface area of the housing and power transfer passages but preferably the passages shown are used but additional connected cavities or an enclosing jacket as described below on a motor could be used. The cooling, power circuit passages and stiffening ribs 126, 127 and 128 stiffen and silence the front face of the pump and cooperate with each other for stiffening and strengthening the power circuit passages. From the above it will be seen that the broken away portions of FIG. 1 are the camshaft 27 drive and pump parts, except the pintle 42 interior, power passages and lower control ring 53, are on the pump vertical center line, the pintle 42 interior is on a through water cavity 123 line and the passages are on a line extending through the center of port 119 and passage 73. FIG. 3 is on a vertical center line except that the interior pintle section is on a line through ports 71, 72 and the port 119 and passage 73 is like FIG. 1.

The rotor 46, FIG. 3, has a vent 129 so fluid is not trapped between it and the pintle so fluid forces on the rotor are axially balanced, has thrust washers 131 between it and the pintle shoulder and washer 132 between it and the intermediate housing 32 to axially locate the rotor. The rotor has a splined input shaft 133 extending therefrom which is connected by a torsion spring damper drive device 134 to the engine camshaft 27 functioning as the engine power output shaft but running at one half crankshaft speed to provide a half speed pump drive for improved efficiency and quieter operation. The conventional torsion spring damper device has a hub member splined to each shaft. Each hub member has a disc portion in adjacent facing relation with an annular series of torsion damping drive transmitting springs 136 therebetween. While during pumping operation the hydrostatic pressure keeps the cylinders engaged with bearing ring 51, lightweight flexible positioning rings 137, one on each side of the spokes fit in a chordal recess 138, one on each side and parallel to each other, in the inner end surface of each cylinder to hold the cylinders in light pressure contact with ring 51 when the pump is shut down and flex axially so the rings exert no significant axial load through the cylinders to the pistons. A cover 139 encloses the space around the torsion drive device 134 at the top of the pump and the engine head to the point where the intermediate housing 32 is sealed to the engine block.

The right motor 12 (FIGS. 1 and 2) and left motor 13 (FIGS. 2 and 4) are identical to each other, but face in opposite directions and have respectively an inner housing portion 141, 142 cast as an integral portion of the engine block and an outer housing portion 143, 144 secured together by an annular series of screws 146, 147. The internal motor parts are the same as the above described internal pump parts, though in the pump they are mounted horizontally for horizontal movement of the control ring 53 and in the motors they are mounted vertically for vertical movement of the control ring 53'. Thus the same reference numerals primed have been used to indicate the motor parts such as pintle 42' secured by bolts 43' to the engine block 16, pintle power circuit ports 71', 72' and water cooling cavity 123' and connecting passage 124', the rotor 46', the rotor or output shaft 133' and spoke pistons 47', the cylinders 49', hydrostatic bearing ring 51', needle bearing 52' and control ring 53'. The motor control rings 53' have their opposed parallel flat bearing surfaces, like surfaces 54, 55 in sliding bearing contact with flat bearing surfaces, like bearing surfaces 56, 57 on the bearing blocks, like bearing blocks 58, 59 and similarly secured to inner housings 141, 142 on each side of the control rings 53' to guide them for vertical sliding movement. Each of the motor bearing blocks is the same and mounted vertically, like the right motor 12, right side bearing block 58', FIG. 1, having flat bearing surface 56' in sliding contact with the flat bearing surface 54' on the control ring 53'. The as in the pump, the motor bearing blocks also provide a fluid seal between the control ring 53' and housing in both motors to form upper and lower servo chambers 152, 153 which when selectively supplied with fluid from a displacement control system by control passages 154, 156 control the eccentricity of the respective control ring 53' to control the displacement of the motors. The pintles 42' have their flanged or inboard end secured by screws 43' on the right and left motor faces 98 and 102 and are centrally located within right and left motor inner housings 141, 142. The right motor 12, pintle 42', is like the pump pintle 42 but is rotated 90° and as viewed in FIG. 1 from the outboard end, port 69' is in the upper left quadrant, port 68' is in lower right quadrant and water cavity 123' extends diagonally and vertically with connecting portion 124' at the top right. The left motor 13 pintle 42' is like pump pintle 42 but is rotated 90° so as viewed in FIG. 1 from the flange end, port 69' is in the upper right quadrant, port 68' is in the lower left quadrant and water cavity 123' extends vertically with connecting portion 124' at the top left.

Thus the upper right passage 91, terminating in port 96 at right block. If desired; a passage pintle port 69', is shorter than the lower right passage 92 terminating in port 97 at right motor pintle port 68'. The upper left passage 93, terminating in port 99 at left motor pintle port 69', is longer than lower left passage 94 terminating in port 101 at left motor pintle port 68'. The passages 124' in the right and left motors for connecting the pintle cooling fluid cavity 123' to the engine cooling system are both located at the top of the pintle and in the right motor extends away from the pump end of the engine and in the left end extends toward the pump end of the engine respectively to annular passages 161 and 162 in the block.If desired; a passage 158 at the lower end of cavity 123'; as shown on left motor 13, may be provided so the cavity 123' is connected at the top and bottom to annular cooling fluid passage 161. The annular passage 161 is formed as a recess in the block and covered by the flange of pintle 42'. The mounting faces 98 and 102 are preferably merely sufficient to seal ports 96, 97, 99 and 101 therein to right and left motor pintle ports 68' and 69' so annular cavity 161 is generally circular except that it has a central boss or bosses providing the above ports and a peripheral sealing shoulder and bosses to receive the pintle flange and screws 43'. Thus cooling fluid in passage 161 contacts a substantial portion of the pintle inner face and is open to pintle cavity 123'. The water cavity 123' of right motor 12 is similarly connected to a similar annular cooling fluid passage 162. These annular passages 161, 162 are connected to the engine cooling cavity 111 as shown at the left motor 13, FIGS. 2 and 4 where passage 161 is connected at the top and pump side to cavity passage 163, a part of the engine cooling fluid cavity 111 in the engine housing which includes the cooling fluid cavity 164 between the outer walls and cylinders of the block 16 and cooling cavity 165 between the inner and outer walls of the head 17.

Cavity passage 163 between annular passage 161 and the pump end of the engine block extends downwardly between the outer surface 171 of the inner wall 172 and the engine block exterior wall 173 which is a flat continuation of the portion 173 shown in FIG. 2 forming the common engine and motor housing wall. Thus the power transfer passages 91, 92, 93 and 94 are covered with cooling fluid for cooling and silencing.

The hydrostatic pump is jacketed by passages 117 and 118 to substantially cover a major portion of the pump housing for cooling and silencing. For full silencing the motors are also jacketed. Both motors, as shown on left motor 13, may have a jacket plate 166 sealed at the inner and outer perimeters to the outer housing 144 to provide annular cooling fluid cavity 167 which is connected by passage 168 to cooling fluid cavity 163 in the engine block.

Fuller cooling and silencing of both motors may be provided, as shown on right motor 12, FIG. 2, by a full jacket 174 of cup shaped configuration with a sealing flange 175 secured and sealed to flange 176 on block and motor housing wall 172 by screws. The jacket contacts outer housing 143 at screws 146 which secure both in position, but intermediate portions of the jacket are spaced from the cover so passage 177 from the engine cooling cavity interconnects the cavity between jacket 174 and the cylindrical side and circular end of the motor 12. Both cover plates are suitably sealed as by screws and a gasket around the central shaft aperture in the cover or outer housing. Thus, the motors may have cooling fluid on both sides as shown in the left motor, the annular passage 161 and the cavity 167 of jacket 166 or in right motor, the annular passage 162 and the cavity of jacket 174.

The engine camshaft 27 is used as the engine power output shaft to drive the pump at half engine speed for improved hydrostatic pump efficiency. The pump housing is mounted at interface 31-33 on the engine block and thus has a more rigid lightweight housing. The common fluid cooling system more effectively cools the engine and pump and the pump cooling passages also function as the engine cooling crossover passages and eliminate this conventional engine component. Since the pump drives two motors, all having the same displacement capacity, there is a 2:1 speed reduction in the hydrostatic transmission from half engine speed for proper safe speed. The motors have an inner housing portion formed as a part of and on the exterior surface of the engine block. The motors also have a cooling system in common with the engine cooling system and are mounted facing and having their output shafts 133' facing away from the sides of the engine. These shafts are directly connected, as by swing axles, to the drive wheels.

Figure 6:
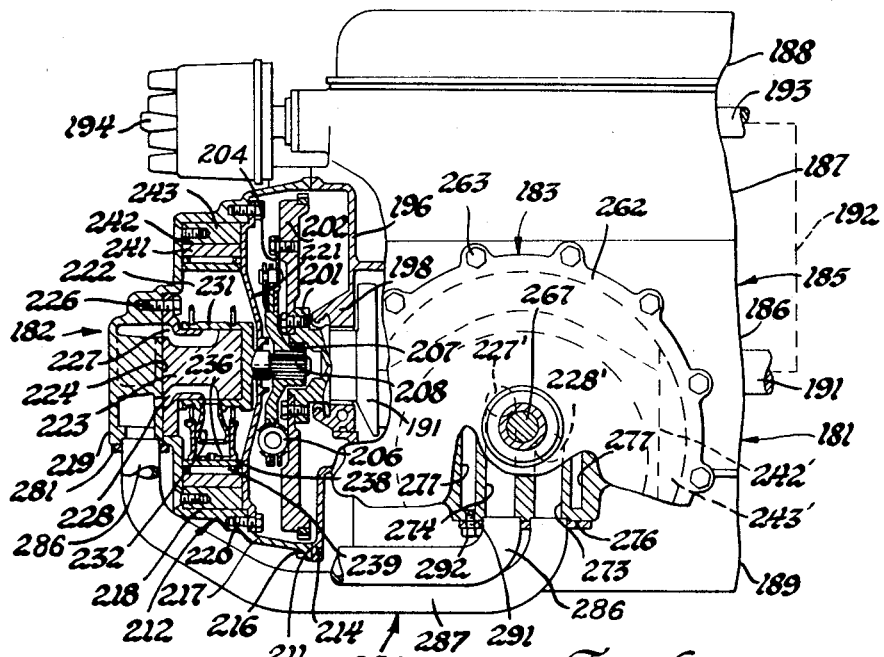
FIG. 6 is a partial elevation of a modified assembly with parts broken away to show features.
Figure 7:
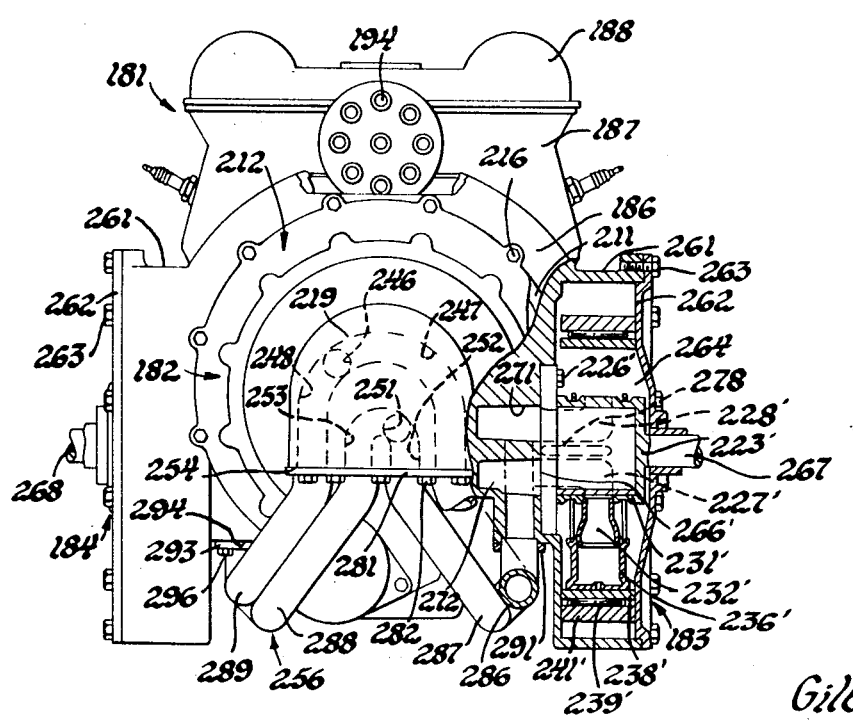
FIG. 7 is an end view of the modified FIG. 4 assembly with parts broken away to show motor features.

The modified unitary power assembly as shown in FIGS. 6 and 7, has an internal combustion engine 181 and a hydrostatic transmission having a pump 182, right motor 183 and left motor 184. The engine has a housing 185 having a block 186, a head 187, a valve cover 188 and an oil pan 189. The power producing means including crankshaft 191 is connected by a conventional diagrammatically shown timing shaft drive 192 to the camshaft 193 which also drives distributor 194. The engine block has at the output end a wall 196 having a central opening with a bearing support flange, seal and bearing 198 for the output end of the crankshaft 191, the power delivery shaft. Crankshaft 191 has an output flange 201 to which flywheel 202 is fixed by screws. The flywheel is connected by a multi strap drive 204 to torsional damper 206 having a hub 207 driving pump shaft 208. The strap drive 204 includes a plurality of straps secured by screws to the flywheel and secured to the input plate of the torsional damper. The drive is transmitted from the input plate through the springs to the output plate fixed on hub 207.

The end engine wall 196 of the engine block has a circular peripheral supporting face 211. The pump housing 212 has an annular mounting face 214 engaging supporting face 211 and is secured to the engine block by the annular series of screws 216. The pump housing 212 from the end with face 214 has a conical supporting portion 217, a cylindrical pump chamber portion 218 and a pintle supporting and power circuit passage outer wall portion 219. An inner wall or cover portion 221 is secured by screws 220 to the pump housing at the inner edge of the cylindrical portion. The cylindrical portion 218, outer wall 219 and inner wall 221 of the pump housing enclose the pump in chamber 222. The pump 182 has pumping parts similar to the above pump 11. The pintle 223 is fixed at interface 224 to the outer wall 219 by screws 226 and has power circuit passages, upper passage 227 and lower passage 228 each extending axially and terminating in slot ports in the cylindrical pintle surface which rotatably supports the rotor 231 which is integral with or secured to input shaft 208. The rotor has an annular series of apertures with hollow spoke pistons 232 having a terminal end spherical piston portion reciprocally fitting in cylindrical cylinders 236. The cylinders have a hydrostatic bearing slipper end providing hydrostatic bearing support of the cylinders on the bearing ring 238 which is rotatably supported by the needle bearing 239 on the internal cylindrical surface of the control ring 241. The control ring has top and bottom flat bearing and sealing interfaces 242 with top and bottom guide blocks 243 fixed to the housing to mount the control ring in the housing for horizontal reciprocating movement to vary the pump eccentricity and thus displacement.

The pump pintle power circuit passages 227 and 228 are connected at interface 224 respectively to axial passage 246 which has a right and left downwardly extending branch passages 247 and 248 and to axial passage 251 which has right and left downwardly extending branch passages 252 and 253. These branch passages extend to interface 254 and are connected by manifold 256 described below to the motors.

The right and left motors 183 and 184, as illustrated for the right motor have an inner housing portion 261 formed as an integral part of the engine block portion 186 of the engine housing 185 and an outer housing or cover 262 secured by screws 263 to the inner housing portion to form the motor chamber 264. The working parts of the motors are the same as in the pump and primed reference numerals are used to identify these parts, the pintle 223', the screws 266' securing the motor pintle at the interface 266' with the engine block, the rotor 231' and pistons 232', cylinders 236', bearing ring 238', needle bearing 239' and control ring 241'. The control rings 241' of the motors are mounted for vertical reciprocating movement to vary motor displacement and thus the bearing blocks 243' are mounted vertically so the bearing interfaces 242' are parallel and vertical. The right and left motor rotors 223' have integral therewith, or fixed thereto, right and left output shafts 267, 268. The pump and motors are thus essentially like the pumps and motors of the above described first modification except the pump is not cooled.

The engine block 186 has transverse horizontal power circuit passages 271 and 272 aligned respectively with passages 228' and 227' in the pintle and connecting with vertical passages 273 and 274 which extend to the interface 276 portion of the engine block. A portion 277 of the engine water cooling cavity, as in the above described first modification contacts the passage portions in the block with cooling fluid and the motor pintles may also have a connected cooling fluid cavity 278.

The power transfer passage manifold 256 has a plate 281 secured by screws 282 to face 254 on the pump housing portion 219. The pipes 286, 287, 288 and 289 are secured, as by welding, to pump end plate 281 to connect respectively with passages 247, 252, 253 and 248 in the pump housing. Pipes 286, 287 are welded or otherwise secured to plate 291 suitably secured by screws 292 to face 276 on the engine block adjacent the right motor 183. Pipes 288, 289 are secured to plate 293 fastened to similar face 294 on the engine block for the left motor 184 by screws 296. In this modification the pumps and motors may be cooled and silenced as shown in FIG. 2 for left and right motors 13 and 12 by a jacket cover plate and passage similar to jacket cover plate 166 or 174 and passage 168 or 177 respectively, FIG. 2.

The manifold is air cooled but could use double wall pipes for cooling fluid jacketing.

While several modifications of the invention have been described with reference to the illustrative embodiments, it will be understood that other modifications may be made.

What is claimed is:

1. In a unitary power assembly; a combustion engine having an engine housing with an exterior wall, a power output shaft, power developing means in said engine housing delivering power to said shaft and an engine cooling fluid cavity in said engine housing around said power developing means; transmission means mounted directly on said exterior wall having a transmission cooling fluid cavity directly connected to said engine cooling fluid cavity.

2. The invention defined in claim 1 and said transmission means having an interface wall contacting said exterior wall and an opposite exterior wall having a double wall structure providing said transmission cooling fluid cavity therein to provide a cooling fluid cavity substantially covering said power developing means and transmission means.

3. The invention defined in claim 1 and said transmission means being a hydrostatic transmission having a pump, motor and interconnecting power transfer passages having exterior walls and said engine cooling fluid cavity and said transmission cooling fluid cavity covering substantially all of the exterior walls of said engine housing and exterior walls of said transmission means.

4. The invention defined in claim 1 and said engine housing exterior wall having an opening to said engine cooling fluid cavity and said transmission means having a fixed member having said transmission cooling fluid cavity secured to said exterior wall to close said opening and connect said engine and transmission cooling fluid cavities.

5. In a unitary power assembly; a combustion engine having an engine housing including an exterior wall having an exterior supporting pad having power transfer ports within said supporting pad; a hydrostatic transmission having a pump hydrostatic unit, a motor hydrostatic unit and connecting power transfer passage means including power transfer passage portions extending longitudinally within said exterior wall and then transversely to said power transfer ports; one of said hydrostatic units having a mounting pad with power transfer ports within said mounting pad and said hydrostatic unit being secured to said exterior wall with said power transfer ports in said supporting pad and mounting pad in fluid communication with each other.

6. The invention defined in claim 5 and said one of said hydrostatic units having a housing having an inner and outer section and said inner section being formed as an integral part of said exterior wall.

7. The invention defined in claim 5 and said one hydrostatic unit having a cooling fluid cavity, said engine having a cooling fluid cavity and means directly interconnecting said cavities.

8. The invention defined in claim 5 and said engine housing including a cooling fluid cavity; said supporting pad including an opening around said power transfer ports therein, said one of said hydrostatic units including a pintle having said hydrostatic transmission mounting pad and having a pintle cooling fluid cavity and said pintle being secured to said exterior wall to close said opening and connect it to said pintle cooling fluid cavity and connect said power transfer ports in said supporting and mounting pads.

9. In a unitary power assembly; a combustion engine having an engine housing, a power output shaft rotatably mounted on said engine housing, engine power generating means in said housing connected to drive said output shaft, fluid cooling cavity means in said engine housing, a supporting pad surface on an external side of said engine housing and a cooling fluid port within said supporting pad surface; a hydrostatic transmission having a pump hydrostatic unit and a motor hydrostatic unit; one hydrostatic unit having a mounting pad surface, a cooling fluid cavity therein, and a cooling fluid port within said mounting pad surface and said one hydrostatic unit being secured to said engine housing with said supporting and mounting pad surfaces in face to face relation and said cooling fluid ports in each surface in fluid communication providing a common engine and hydrostatic unit fluid cooling system.

10. The invention described in claim 9 and said one hydrostatic unit having hydrostatic converting means and housing means surrounding said hydrostatic converting means having a double wall portion forming said cooling fluid cavity.

11. The invention described in claim 9 and said one hydrostatic unit having hydrostatic converting means including a fixed member having power transfer passages and ports and said cooling fluid cavity being in said fixed member.

12. The invention described in claim 9 and said one hydrostatic unit being a radial type unit having a unit housing, hydrostatic converting means including a cylindrical pintle fixed at one end to said unit housing and having power transfer passages and ports, a rotor mounted for rotation on said pintle and piston and cylinder means cooperating between said rotor and housing and said cooling fluid cavity being in said pintle.

13. In a unitary power assembly; a combustion engine having an engine housing having an engine cooling fluid cavity and fluid power transfer passages having walls contacted by cooling fluid in said engine cooling fluid cavity and a hydrostatic transmission having a hydrostatic pump unit, a hydrostatic motor unit and fluid power transfer passage means including said fluid power transfer passages in said engine housing interconnecting said hydrostatic pump and motor units.

14. The invention defined in claim 13 and one of said hydrostatic units having a cooling fluid cavity directly connected to said engine cooling cavity.

15. The invention defined in claim 13 and one of said hydrostatic units being a radial unit having a pintle; said fluid power transfer passage means also including pintle passages in said pintle and said pintle having a pintle cooling fluid cavity directly connected to said engine cooling fluid cavity.

16. The invention defined in claim 13 and said hydrostatic units being directly mounted on said engine housing and having fluid cooling cavities directly connected to said engine cooling fluid cavity.

17. In a unitary power assembly; a combustion engine having an engine housing, a power output shaft rotatably mounted on said engine housing, a hydrostatic pump supporting pad on one end of said engine housing, combustion engine power generating means in said engine housing operatively connected to deliver power to said output shaft, a hydrostatic motor supporting pad on each side of said engine housing and facing oppositely and outwardly from said engine housing; a hydrostatic pump unit mounted on said pump supporting pad and having a pump input shaft driven by said power output shaft; a hydrostatic motor unit mounted on each hydrostatic motor supporting pad and having a motor output shaft extending outwardly from said engine housing and supply and return power transfer passage means connecting said hydrostatic pump to each hydrostatic motor.

18. The invention defined in claim 17 and said power transfer passage means having a passage pad on each side of said engine housing, a pair of passages connecting each passage pad to said motor supporting pad for supplying said hydrostatic motors and a unitary manifold having four pipes, a pump attachment plate secured to said four pipes and two motor attachment plates each secured to two pipes, said pump attachment plate being secured to said hydrostatic pump unit and each motor attachment plate being secured to said passage pad.

19. The invention defined in claim 17 and said pump having a housing having a mounting face engaging said supporting face on said engine housing and said power transfer passage means including passage portions in said pump housing extending to said mounting face and passage portions in said engine housing extending from said supporting face to said hydrostatic motor supporting pads.

20. The invention defined in claim 17 and said engine housing having an exterior wall; one of said hydrostatic units having a housing having one part formed as an integral part of said exterior wall of said engine housing and a cover part closing said one part.

21. In a unitary power assembly; a combustion engine having an engine housing have an engine cooling fluid cavity; a transmission unit having a transmission housing mounted on said engine housing; said transmission housing having a transmission cooling fluid passage connected to said engine cooling fluid cavity, a radiator connected to said transmission cooling fluid passage and means to return fluid from said radiator to said engine cooling fluid cavity for circulation of cooling fluid from said radiator in series through said engine cooling fluid cavity, said transmission cooling fluid passage and to said radiator.

22. The invention defined in claim 21 and said engine being a V-type having a V-type housing, a power output shaft rotatably mounted on and projecting from the upper central part of one end of said V-type engine housing and a cooling fluid port in each side upper portion of said one end of said V-type housing connected to said engine cooling fluid cavity; said transmission housing being secured in face to face relation to said one end of said engine housing covering said cooling fluid ports in said engine housing and having a transmission shaft aligned with and drive connected to said power output shaft and said transmission cooling passage being an inverted V-shaped passage having an apex and two legs with each leg connected to one of said cooling fluid ports and the apex connected to said radiator.

23. In a hydrostatic transmission; a hydrostatic motor unit, a hydrostatic pump unit, power transfer passage means connecting said hydrostatic units; one of said units including a stationary housing having stationary hydrostatic means and rotary hydrostatic means cooperating with said stationary hydrostatic means for converting fluid pressure and power, said stationary housing enclosing and supporting said stationary and rotary hydrostatic means and having an exterior stationary wall portion constituting a major heat and sound emitting portion of said housing; stationary jacket means on said housing covering and spaced from said stationary wall portion and having a rim sealed and secured to said wall portion providing a cooling liquid cavity between said wall portion and said jacket and having an internal wall surface formed by said wall portion and jacket means and means to maintain said jacket cavity filled with cooling liquid in substantially complete contact with said internal wall surface and to circulate the cooling fluid through said cavity to cool and silence the hydrostatic unit.

24. The invention defined in claim 23 and an engine having a housing having a cooling liquid cavity; said hydrostatic unit being a radial type unit with a cylindrical housing and having one end wall secured to said engine housing and the opposite end being said wall portion covered by said jacket to provide a cooling and silencing cooling liquid cavity at each end of said one hydrostatic unit.

25. In a hydrostatic transmission; a hydrostatic pump unit, a hydrostatic motor unit and power transfer passages connecting said hydrostatic units; one of said hydrostatic units having a unit housing a cylindrical pintle having an axis fixed at one end to said housing, a rotor mounted on said pintle for rotation about said pintle axis having an annular series of ports, a control ring nonrotatably mounted in said unit housing and having its axis eccentric to said pintle axis and piston and cylinder means operatively connected to said control ring and rotor and in fluid communication with said ports having relative reciprocating movement during rotation of said rotor; a pair of spaced chordal ports transversely located in said pintle symmetrically located on each side of a transverse line through said pintle axis and control ring axis, an axial passage extending from each chordal port to said one end of said pintle a cooling fluid cavity in said pintle between said chordal ports extending from said one end of said pintle almost to the other end of said pintle and a passage to supply cooling fluid to said cooling fluid cavity.

26. The invention defined in claim 25 and a jacket covering a major wall portion of said housing to provide a cooling fluid cavity between said wall portion and jacket for cooling and silencing and passage means for supplying cooling fluid to said cavity between said wall and jacket to reduce heat and sound emission.

* * * * *